(12) United States Patent
Gardner

(10) Patent No.: US 11,309,804 B2
(45) Date of Patent: Apr. 19, 2022

(54) PODL POWERED DEVICE WITH ACTIVE RECTIFIER BRIDGE AND SHUNTING SWITCH

(71) Applicant: Analog Devices International Unlimited Company, Limerick (IE)

(72) Inventor: Andrew J. Gardner, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 182 days.

(21) Appl. No.: 16/863,538

(22) Filed: Apr. 30, 2020

(65) Prior Publication Data

US 2020/0358368 A1 Nov. 12, 2020

Related U.S. Application Data

(60) Provisional application No. 62/845,217, filed on May 8, 2019.

(51) Int. Cl.
| | |
|---|---|
| *H04L 12/28* | (2006.01) |
| *H02M 7/219* | (2006.01) |
| *H04L 12/10* | (2006.01) |

(52) U.S. Cl.
CPC ............ *H02M 7/219* (2013.01); *H04L 12/10* (2013.01)

(58) Field of Classification Search
CPC ............... H04L 12/10; H04L 12/40045; H04L 25/0298; H04L 25/0276; H04M 7/219
See application file for complete search history.

(56) References Cited

U.S. PATENT DOCUMENTS

| | | | | |
|---|---|---|---|---|
| 10,333,742 | B1* | 6/2019 | Bhagwat | H04L 25/0276 |
| 10,382,216 | B1* | 8/2019 | Bhagwat | H04L 12/10 |
| 10,594,367 | B1* | 3/2020 | Bhagwat | H04L 12/40045 |
| 2007/0260904 | A1* | 11/2007 | Camagna | H04L 12/10 |
| | | | | 713/310 |
| 2015/0295735 | A1* | 10/2015 | Gardner | G06F 13/4072 |
| | | | | 307/1 |
| 2015/0333935 | A1* | 11/2015 | Gardner | H02M 3/158 |
| | | | | 307/1 |
| 2016/0054777 | A1* | 2/2016 | Dwelley | G06F 1/3206 |
| | | | | 710/110 |
| 2018/0024620 | A1* | 1/2018 | Gardner | G06F 1/3287 |
| | | | | 713/323 |
| 2019/0068385 | A1* | 2/2019 | Gardner | H02J 3/02 |
| 2019/0288862 | A1* | 9/2019 | Bhagwat | H04L 12/10 |

(Continued)

*Primary Examiner* — Abdelnabi O Musa
(74) *Attorney, Agent, or Firm* — Schwegman Lundberg & Woessner, P.A.

(57) ABSTRACT

A Power over Data Lines (PoDL) system includes a Powered Device (PD) logic circuit for conveying classification information to Power Sourcing Equipment (PSE), during a classification phase, via a wire pair. The logic circuit controls a shunting switch for selectively shunting the wires together for communication with the PSE during the classification phase. A holdup capacitor supplies power to the logic circuit during the classification phase. The logic circuit controls a full-bridge rectifier to ensure the capacitor is charged with a proper polarity voltage and to ensure a proper polarity voltage is supplied to a PD load. The PD has a controller for controlling the rectifier to cause a current path between terminals of the capacitor, via the shunting switch, when the shunting switch is to be turned on.

20 Claims, 7 Drawing Sheets

(56) References Cited

U.S. PATENT DOCUMENTS

2020/0044875 A1\* 2/2020 Gardner .............. H04L 25/0276
2020/0304106 A1\* 9/2020 Gardner ................. H04L 12/10
2021/0036897 A1\* 2/2021 Gardner ............ H04L 12/40045

\* cited by examiner

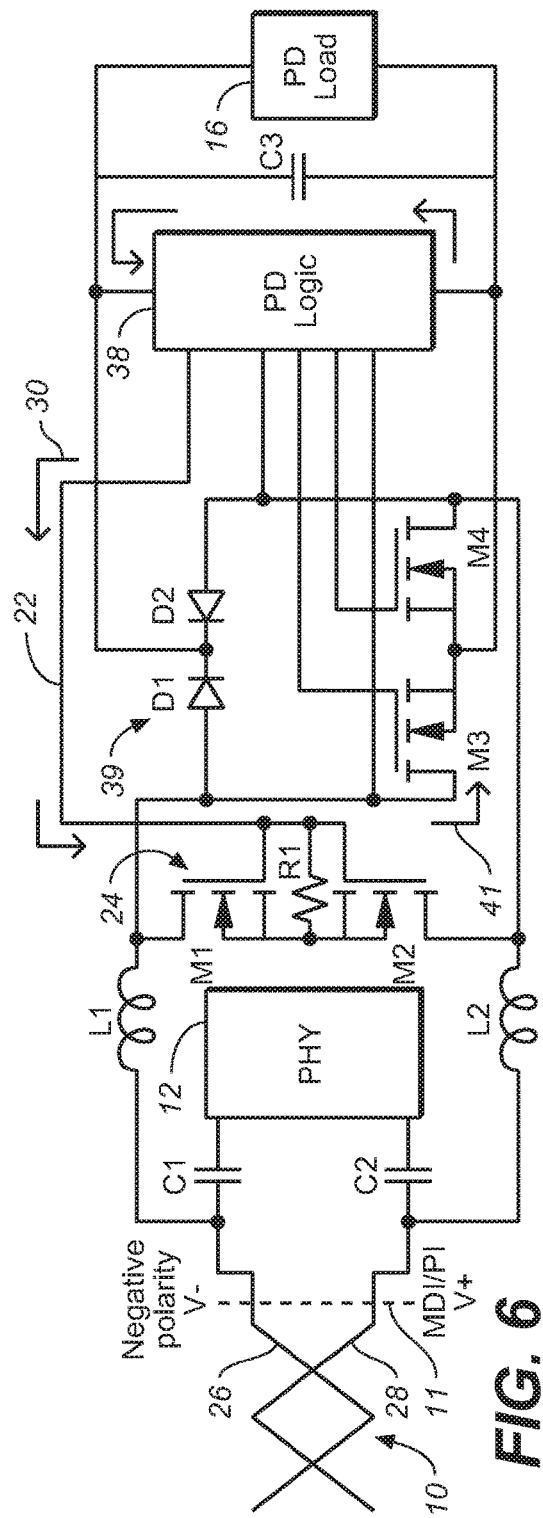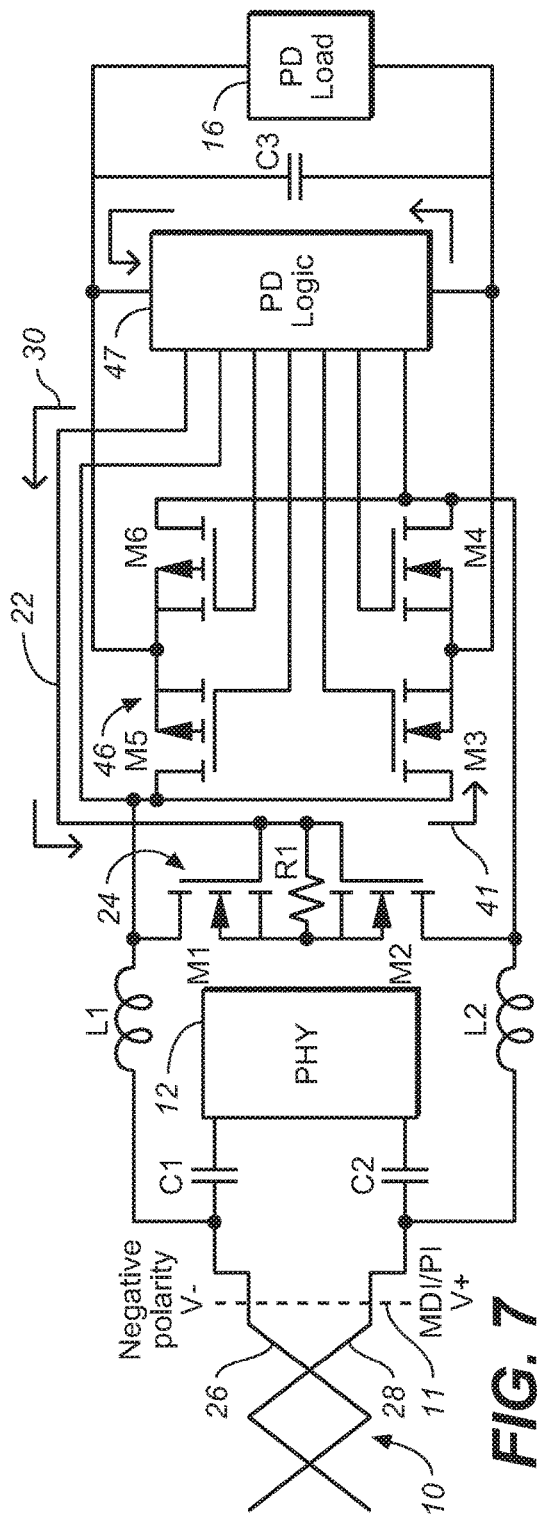
FIG. 6
FIG. 7

PODL POWERED DEVICE WITH ACTIVE RECTIFIER BRIDGE AND SHUNTING SWITCH

CROSS-REFERENCE TO RELATED APPLICATIONS

This application is based on and claims priority from U.S. Provisional Application Ser. No. 62/845,217, filed May 8, 2019, by Andrew J. Gardner, incorporated herein by reference.

FIELD OF THE INVENTION

The invention relates to Power over Data Lines (PoDL) systems, where DC power and data signals are provided over the same twisted wire pair, and, in particular, to techniques to allow the Powered Device (PD) to communicate classification information to the Power Sourcing Equipment (PSE), during a low power classification phase, even though the PD uses a full-bridge rectifier for DC polarity correction.

BACKGROUND

It is known to transmit DC power over differential data lines to power remote equipment. Power over Data Lines (PoDL) is an example of one such system. In PoDL, limited power is transmitted over a single, twisted wire pair along with the differential data. Certain standards for PoDL are found in IEEE P802.3bu.

The DC voltage does not affect the differential data due to DC coupling/decoupling circuits and AC coupling/decoupling circuits. In this way, the need for providing any external power source for the Powered Devices (PDs) can be eliminated. The PD load may be a telephone, video camera, etc.

PoDL typically requires some sort of low power handshaking between the Power Sourcing Equipment (PSE) and the PD before the full power/voltage is applied to the wire pair by the PSE. This is because different types of PDs may need different maximum power levels, or may not be PoDL-compatible. Other information may also be conveyed during the handshaking phase. The digital information conveyed during the handshaking phase cannot use the PD's differential data PHY (an Ethernet transceiver), since the PHY is not yet powered.

Such handshaking may consist of a low current/voltage signal being generated by the PSE on the wire pair, and the PD may respond in a characteristic way to identify to the PSE that the PD is PoDL-compatible (typically called a detection signature) as well to identify power requirements (typically called a classification signature), among other information. The classification signature may be digitally conveyed to the PSE by shunting (shorting) the two wires together, using a shunting switch, to force a zero differential signal, and then opening the shunting switch to create a high differential signal. The wires are weakly pulled high by the PSE. Any digital codes may be transmitted in this manner.

The classification portion of the handshaking phase will be referred to herein as the classification phase.

FIG. 1 is an example of one type of conventional PoDL system to which the present invention will be compared. Since the invention only applies to the PD side of the PoDL system, only the PD side is shown. The twisted wire pair 10 is coupled between the PSE and the PD. A media dependent interface (MDI) 11 or power interface (PI) connects the wire pair 10 to the PD. In FIG. 1, the PSE supplies a positive polarity voltage to the wire pair 10, as indicated by the V+ and V− designations at the MDI 11.

The PD side includes a PHY 12, which receives and transmits Ethernet differential data, via the wire pair 10. AC-coupling capacitors C1 and C2 are used to pass the AC data and block DC voltage. The PHY 12 is only powered up once the classification phase is finished. Although not shown, the input power terminals of the PHY 12 are coupled to receive DC power from a voltage regulator powered by the PSE when the full DC voltage is supplied by the PSE. The voltage regulator in the PD provides the proper operating voltage to the PHY 12 and may provide the proper operating voltage to the PD load 16. Also not shown is a communication path between the PHY 12 and the PD load 16, since such communications between the PHY 12 and the PD load 16 may be conventional and independent from the present invention.

During the low power classification phase, the PSE supplies a limited voltage/limited current signal via the wire pair 10, and the DC-coupling inductors L1 and L2 pass the DC voltage to charge a holdup capacitor C3. The PSE may supply a limited pull-up current to the wires in the wire pair 10 to cause the voltage on the wires at the PD to go high unless the PSE or PD pulls down on a wire. Which wire is pulled up and which wire is pulled down determines the polarity (positive or negative) of the voltage applied to the PD during the classification phase. The voltage across the capacitor C3 may be on the order of 5V. A diode 17 is connected in series with the capacitor C3 to block a reverse current flow.

A PD logic circuit 14 (also referred to as a PD controller) is powered by the charge in the capacitor C3. To convey classification information to the PSE, such as the maximum power required by the PD load, the PD logic circuit 14 opens and closes switches 18 and 20 to pull up or down a control line 22 that controls a shunting switch 24, which, in the example, is formed by two n-channel MOSFETs M1 and M2 in series coupled across the wires 26 and 28. The bodies of the MOSFETs M1 and M2 are connected to their respective sources. A high gate voltage on the control line 22 is applied to the gates of the MOSFETs M1 and M2 to turn them on to convey a 0 bit to the PSE. A low gate voltage on the control line 22 turns the MOSFETs M1 and M2 off to allow one wire to be pulled high by the PSE and the other wire to be pulled low by the PSE to convey a 1 bit to the PSE. In this way, the PD logic circuit 14 can convey any classification information to the PSE without using the PHY 12. The arrows 30 indicate the direction of current flow through the control line 22 and the shunting switch 24 between the two terminals of the capacitor C3 when turning on the shunting switch 24. The shunting switch 24 is typically not used (remains an open circuit) during normal operation of the PoDL system after the PD load 16 is fully powered up.

In order to operate the shunting switch 24, there must be a completed circuit between the two terminals of the holdup capacitor C3. This is accomplished by the resistor R1 producing a voltage drop between the gate and source of the MOSFETs M1 and M2. The body diode in MOSFET M2 initially conducts the capacitor C3 current, and when the MOSFET M2 turns on, the capacitor current C3 is conducted through the n-channel of the MOSFET M2.

The circuit of FIG. 1 performs adequately if the PSE supplies voltage of the correct polarity (a positive polarity) to the wires 26 and 28. To ensure that the voltage applied to the PD is the correct polarity, even if the PSE reverses the polarity (a negative polarity), it is desirable to add a full-bridge rectifier in the PD.

A full-bridge rectifier 32 has been added to the PD in FIG. 2 to ensure that the correct polarity voltage is applied internal to the PD irrespective of the polarity supplied by the PSE. The rectifier 32 uses four diodes D1-D4. However, the PoDL system of FIG. 2 does not work during the classification phase, since the PD logic circuit 14 cannot turn on the shunting switch 24. This is because there is no completed current path (circuit) between the two terminals of the holdup capacitor C3 when the shunting switch 24 is intended to be closed. There is no current flow in the control line 22 between the terminals of the capacitor C3, since the diode D4 is reverse biased and blocks the current flow. So, although the rectifier 32 adequately corrects any negative polarity by the PSE during normal (high power) operation, the rectifier 32 prevents the PD logic circuit 14 from communicating to the PSE via the shunting switch 24 during the classification phase.

What is needed is a PoDL system that includes a polarity-correcting full-bridge rectifier, yet allows a PD logic circuit (PD controller) to operate a shunting switch to communicate to the PSE during the classification phase.

SUMMARY

A PoDL system is described where the PD includes a shunting switch, for communicating with the PSE during a classification phase, and a full-bridge rectifier for correcting any negative voltage polarity by the PSE. In order for the rectifier to not block the control line current through the shunting switch, at least two of the diodes in the rectifier are replaced with active switches, such as MOSFETs. The MOSFETs are controlled by a PD logic circuit or other circuit to create a completed circuit in the control line between the terminals of the holdup capacitor when the shunting switch is to be turned on, thus enabling the shunting switch to be controlled when the PSE voltage is either a positive polarity or a negative polarity.

When the shunting switch is on, the inputs of the full bridge rectifier are essentially shorted together, so the MOSFETs cannot be controlled using the conventional technique of detecting the relative voltages across the MOSFETs. The PD logic forces the appropriate MOSFET on, during the time when the shunting switch is to be on, to complete the circuit through the control line between the terminals of the capacitor.

In another embodiment, only the body diodes of the MOSFETs need to conduct for proper rectification during the shunting switch off times, and the appropriate MOSFET is turned on only when the shunting switch is to be turned on.

The holdup capacitor recharges when the shunting switch is off.

During normal operation of the PoDL system, after the classification phase, the full-bridge rectifier operates as a conventional active rectifier to ensure the proper polarity voltage is applied to the PD load. Normal operation to control the MOSFETs in the full bridge rectifier may be by detecting the voltage polarity across the MOSFETs using comparators, which is conventional. Other techniques for controlling the MOSFETs for proper rectification are also envisioned. Alternatively, only the body diodes of the MOSFETs are used to rectify the voltage, and the MOSFETs remain off during the normal operation.

In one embodiment, the PD logic circuit does not control the MOSFETs, and an RC circuit causes the proper MOSFET in the full bridge rectifier to remain on when the shunting switch is to be closed.

The shunting switch may be any type of switch with a control terminal that draws a current from the holdup capacitor.

The PD logic circuit and shunting switch are typically contained in the same package. The active full-bridge rectifier may be external to the package, due to the higher power requirement of the rectifier during normal operation of the PoDL system. In another embodiment, the PD logic circuit, shunting switch, and full-bridge rectifier are provided in the same package.

BRIEF DESCRIPTION OF THE DRAWINGS

FIG. 6 illustrates a variation of FIG. 3 where the shunting switch is located downstream of the DC-coupling inductors.

FIG. 7 illustrates the same circuit as FIG. 6 but where all diodes in the bridge have been replaced with MOSFETs for a reduced voltage drop.

FIG. 9 illustrates a PD circuit with a different type of control scheme for the MOSFETs of the full-bridge rectifier, where an RC circuit causes the proper MOSFET to remain on while the shunting switch is to be turned on.

Elements that are the same or equivalent in the various figures are labelled with the same numerals.

DETAILED DESCRIPTION OF THE EMBODIMENTS

Figure 1:
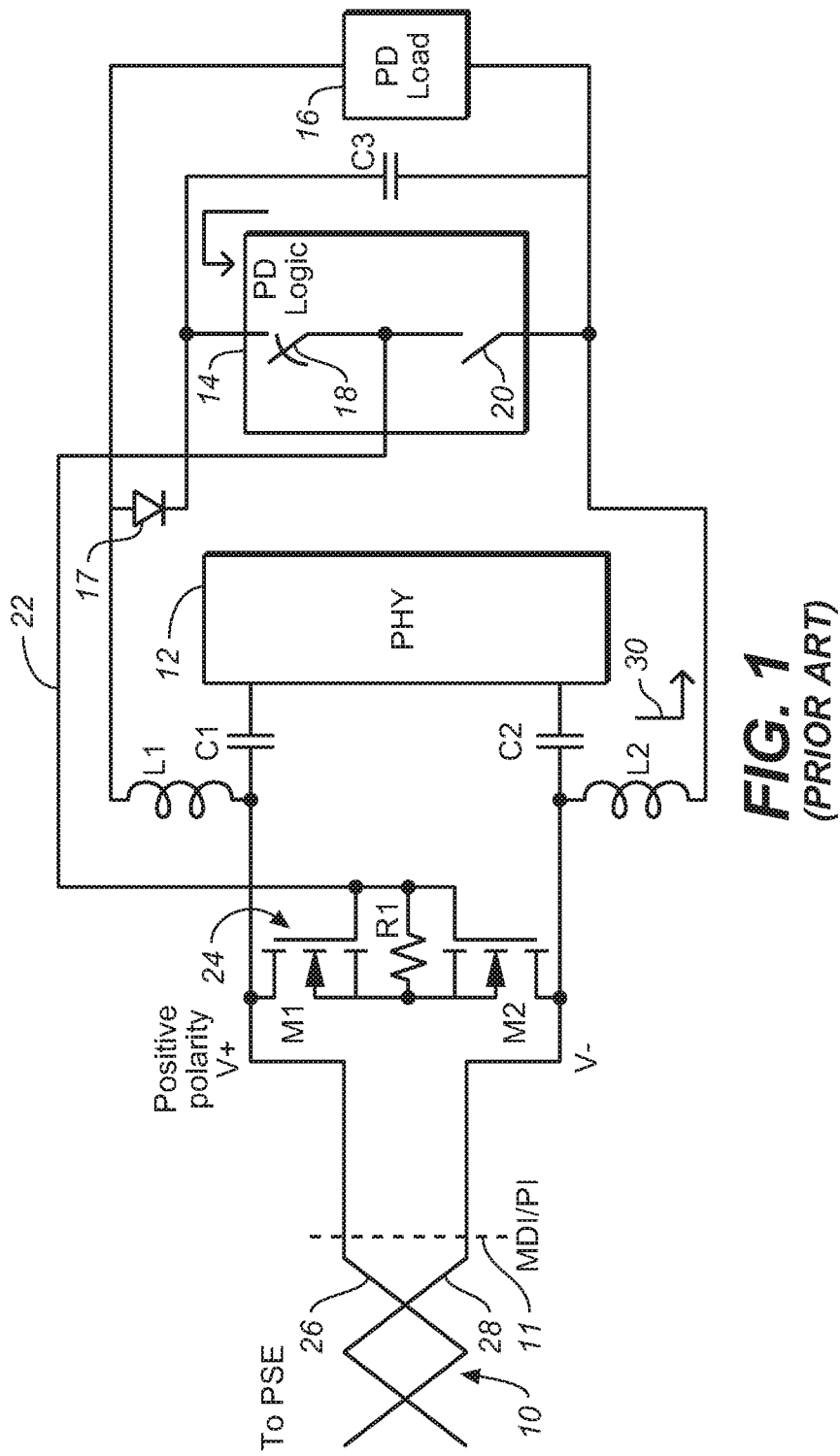
FIG. 1 illustrates one example of the PD side of a conventional PoDL system.
Figure 2:
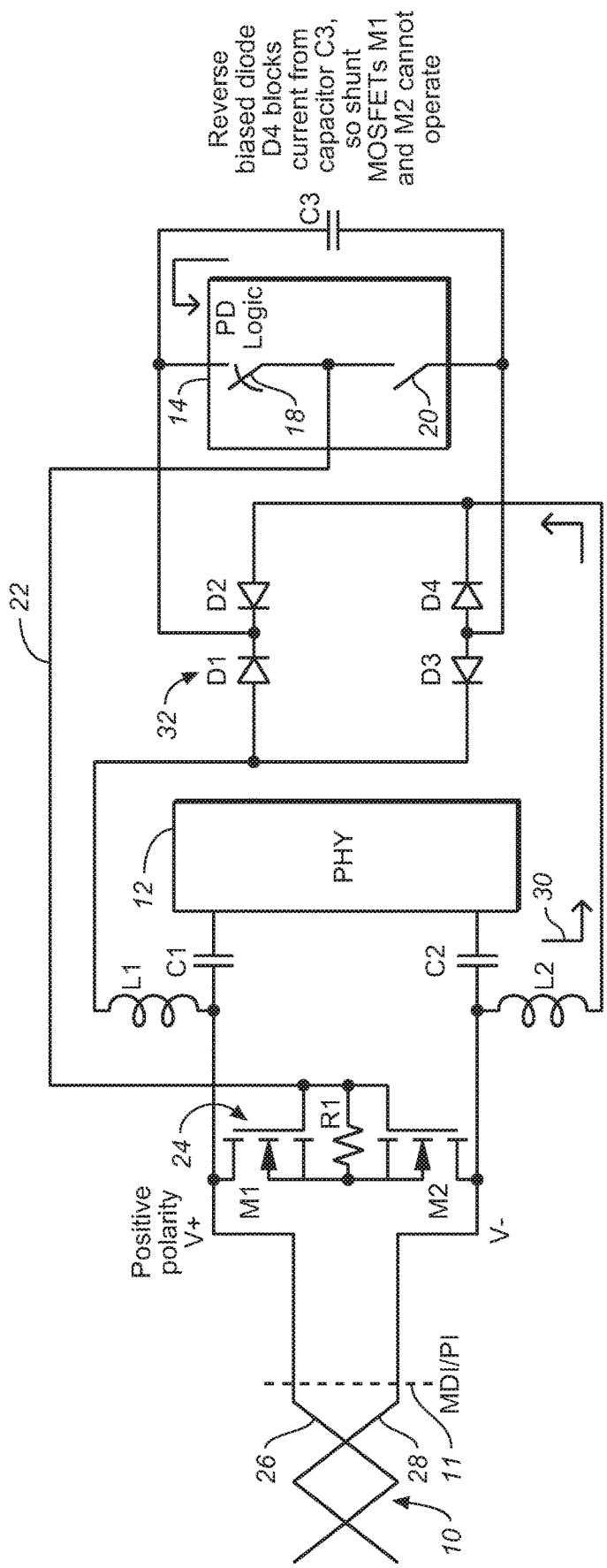
FIG. 2 is identical to FIG. 1 except that a passive full-bridge rectifier has been added for correcting any negative polarity DC voltage from the PSE, although the circuit of FIG. 2 would not work properly during the classification phase.
Figure 3:
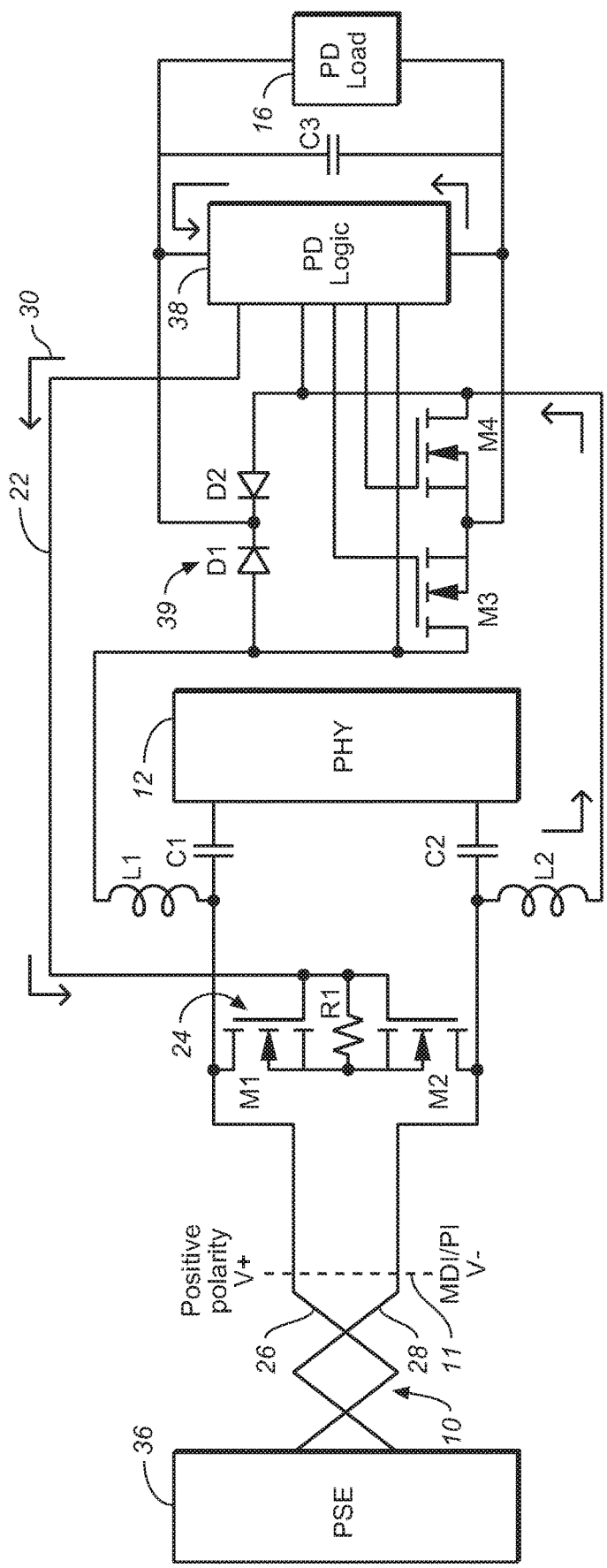
FIG. 3 illustrates the PoDL circuit of FIG. 1 augmented with active switches in the return path of a full-bridge rectifier, where the PD logic circuit controls the active switches in a conventional manner, or the MOSFETs' body diodes perform the rectification, when the shunting switch is open, and the PD logic circuit forces one of the switches to remain on when the shunting switch is to be closed.

FIG. 3 illustrates one embodiment of the invention. Conventional elements that are similar to those in FIG. 1 are labeled with the same numbers, and their functions do not need to be repeated.

During the low power classification phase, the PSE 36 transmits codes and various current levels to the PD logic circuit 38 (also called a PD controller). The various codes may be specified by the IEEE standards for PoDL. The PD logic circuit 38 may be a state machine that responds in certain ways to the signals transmitted by the PSE 36, and other signals, during the classification phase, prior to the full DC voltage being applied to the wires 26 and 28 by the PSE 36 to power the PD load 16 and the PHY 12. The PD logic circuit 38 also contains components for operating the active full-bridge rectifier 39.

In the example of FIG. 3, it is assumed that the PSE 36 applied a positive polarity to the wire pair 10, with a positive voltage V+ applied to the wire 26 and a relative negative voltage V−, referenced to the positive voltage, applied to the wire 28.

The arrow 30 shows the direction of current through the PD components when the shunting switch 24 is closed (on), with current flowing from the top terminal of the capacitor C3 to the gate terminal of shunting switch 24 and current flowing from the gate terminal of the shunting switch 24 to the bottom terminal of the capacitor C3.

The inductors L1 and L2 pass the DC voltage or the low frequency PSE signals during the classification phase. At the beginning of the classification phase, the low power supplied by the PSE 36 charges up the holdup capacitor C3 due to diode D1 being forward biased and the body diode of the MOSFET M4 being forward biased. When the capacitor C3 is sufficiently charged, the PD logic circuit 38 becomes enabled and can then operate the appropriate MOSFET M3 or M4 depending on the polarity of the voltage at the MDI 11. The voltage across the capacitor C3 may be limited to a maximum voltage, such as 5V. The PD logic circuit 38 may control the MOSFETs M3 and M4 like a conventional active bridge or let the body diodes in the MOSFETs M3 and M4 perform the rectification while pulling the gates of M3 and M4 to the common source.

During times when the shunting switch 24 is open, comparators in the PD logic 38 may detect the voltage across each of the MOSFETs M3 and M4 and control the MOSFETs M3 and M4 like ideal diodes to rectify the PSE voltage. That aspect may be conventional. In the case of FIG. 3, the PD logic 38 controls the MOSFET M4 to be on and MOSFET M3 to be off. Alternatively, the MOSFETs' body diodes may perform all the required rectification, and the MOSFETs M3 and M4 may be off except when the shunting switch 24 is to be turned on.

The PD logic circuit 38 then carries out its routine of responding to the PSE handshaking signals with different voltage/current levels on the wires 26 and 28. To convey a 0 bit, the shunting switch 24 is closed. To convey a 1 bit, the shunting switch 24 is opened. Digital codes representing power demands by the PD and other information may then be conveyed in this way to the PSE 36 without the use of the PHY 12.

To close the shunting switch 24, the PD logic circuit 38 applies a sufficiently positive voltage (from the capacitor C3) to the control line 22. This may be done by using pull-up and pull-down switches 18 and 20, shown in FIG. 1. At the same time, the PD logic circuit 38 forces the MOSFET M4 to remain conductive during the time the shunting switch 24 is to be closed. A current loop is created between the two capacitor C3 terminals, which allows a voltage drop to occur across the resistor R1 in the shunting switch 24. The voltage drop is greater than the gate-source threshold voltage of the MOSFETs M1 and M2 to turn them both on to shunt the wires 26 and 28 together to send a 0 bit signal to the PSE 36. When the control signal is low, the shunting switch 24 turns off to send a 1 bit to the PSE 36.

Importantly, the PD logic circuit 38 forces the MOSFET M4 to stay on (or be turned on) to create a current loop if the polarity of the voltage applied to the wires 26 and 28 by the PSE 36 is positive. If the PSE 36 voltage was a negative polarity, as shown by the opposite direction of the arrow 41 in FIG. 4, the PD logic circuit 38 turns on the MOSFET M3.

In either case, the shunting switch 24 can be turned on, since there is a completed current loop between the terminals of the holdup capacitor C3 and the gate of the shunting switch 24.

If the PD logic circuit 38 only controlled the MOSFETs M3 and M4 using conventional techniques for controlling an active bridge (i.e., detecting voltage differentials across the MOSFETs), the MOSFETs M3 and M4 would not be properly controlled when the shunting switch 24 was closed because the wires 26 and 28 would be shorted together, resulting in substantially no voltage difference across the inputs of the full bridge rectifier. Therefore, the PD logic circuit 38 must force the MOSFET M3 or M4 to remain on during times when the shunting switch 24 is to be turned on. Such operation may be controlled by programming of the state machine in the PD logic circuit 38.

Figure 4:
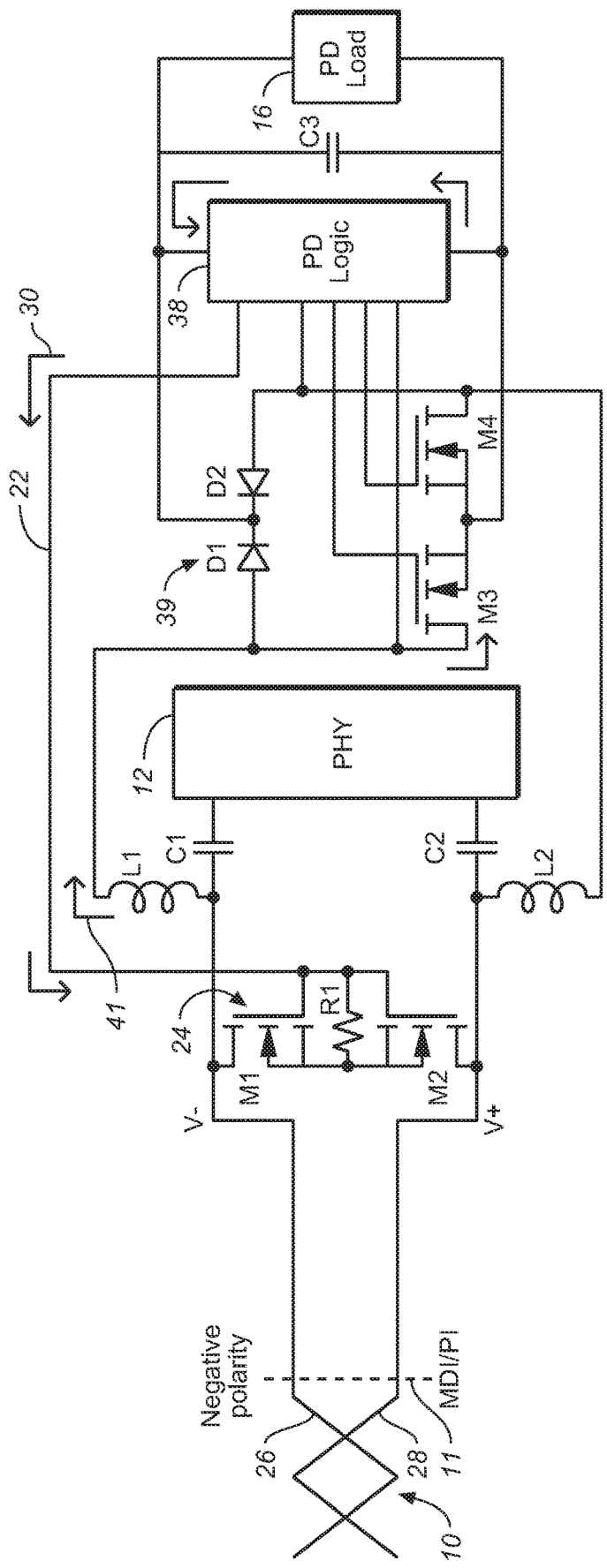
FIG. 4 illustrates the same circuit as FIG. 3 but where the DC voltage polarity from the PSE is a negative polarity, so the current direction into the full bridge rectifier (indicated by the arrows) is opposite to the current direction shown in FIG. 3. The full-bridge rectifier ensures that the correct (positive) polarity is applied to the holdup capacitor and the PD load.

To summarize, in FIG. 3 (PSE supplies a positive polarity voltage), the PD logic circuit 38 forces MOSFET M4 to remain on when the shunting switch 24 is closed, while MOSFET M3 remains off. In FIG. 4 (PSE supplies a negative polarity voltage), the PD logic circuit 38 forces MOSFET M3 to remain on when the shunting switch 24 is closed, while MOSFET M4 remains off.

Figure 5:
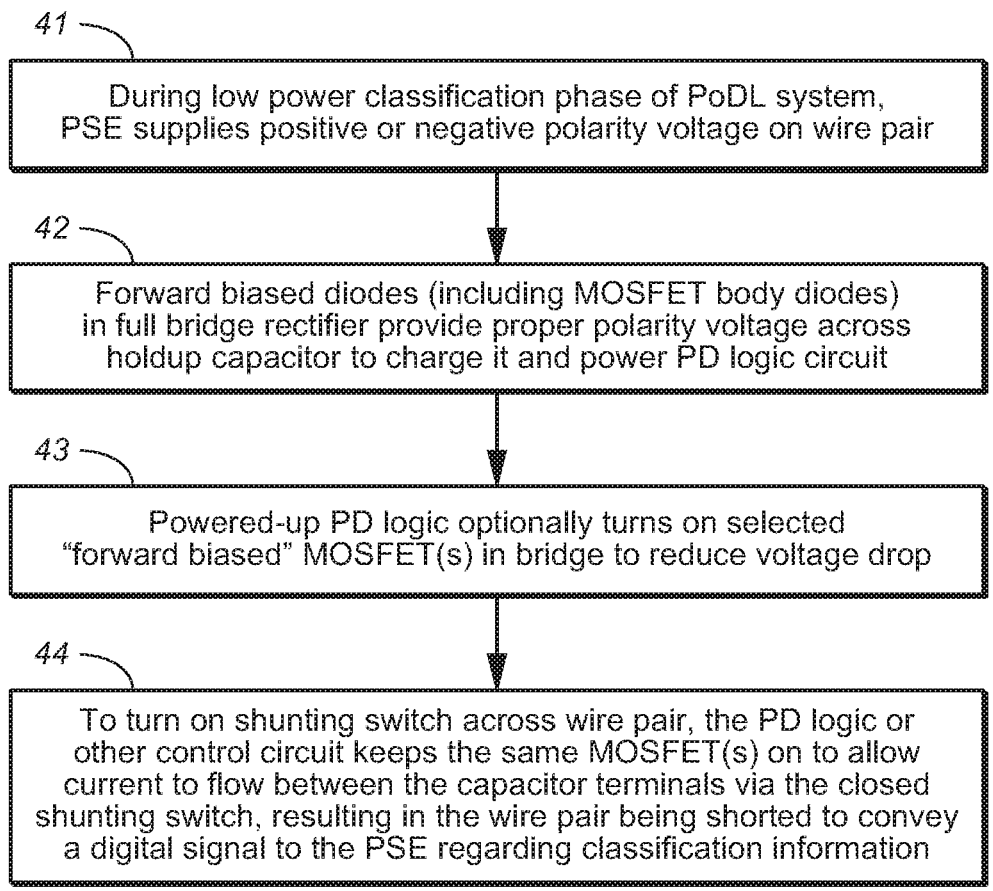
FIG. 5 is a flowchart showing certain steps in the operation of the circuit of FIG. 3 or 4.

FIG. 5 is a flowchart showing certain steps in the operation of the circuit of FIG. 3 or FIG. 4. In step 41, the PSE supplies a positive polarity voltage or a negative voltage polarity voltage across the wire pair 10 during the classification phase.

In step 42, the diodes and MOSFETs in the full bridge rectifier rectify the PSE voltage, and the holdup capacitor C3 is charged with the proper polarity. This enables the PD logic circuit 38.

In step 43, the PD logic circuit 38 optionally controls the MOSFETs M3 and M4 in the conventional way to rectify the PSE voltage. This may be done by detecting the voltages across the MOSFETs M3 and M4 and controlling them as ideal diodes. Basically, when the body diode of a MOSFET is forward biased, the MOSFET should be turned on. Even if the MOSFETs were not controlled, their body diodes would properly rectify the voltage.

In step 44, when the shunting switch 24 is to be turned on, the PD logic 38 (or other control circuit) forces the MOSFET M3 or M4 (depending on the polarity) to remain on or be turned on, even though the inputs into the full bridge rectifier are shorted by the shunting switch 24. Thus, the PD logic circuit 38 control signal for the MOSFETs M3 and M4 augments the conventional control of the MOSFETs M3 and M4.

Such augmented control may be by suitably programming the state machine in the PD logic circuit 38. Those skilled in the art understand how to use the state machine's command to turn on the shunting switch 24 to then augment the control of the MOSFETs M3 or M4 to cause the appropriate MOSFET to remain on be turned on.

FIG. 6 is similar to FIG. 4 except that the shunting switch 24 is located downstream from the inductors L1 and L2. The operation is the same as described above.

FIG. 7 illustrates the use of a full-bridge rectifier 46 that uses all MOSFETs M3-M6 to rectify the voltage. MOSFETs M5 and M6 are p-channel, while MOSFETs M3 and M4 are n-channel. The MOSFETs M3-M6 are controlled in a conventional manner to rectify the voltage during the normal (high power) mode of operation of the PoDL system. The PD logic 47 may detect the relative voltages on the right sides of the inductors L1 and L2 to control the MOSFETs M3-M6.

During the classification mode, the MOSFETs M3 and M4 may be held off by the PD logic circuit 47, thus allowing the body diodes to conduct the current into the capacitor C3 and the PD logic circuit 38. When the shunting switch 24 is to be turned on, the appropriate MOSFET M3 or M4 is turned on, as previously described. The MOSFETs M3 and M4 will have opposite states.

Figure 8:
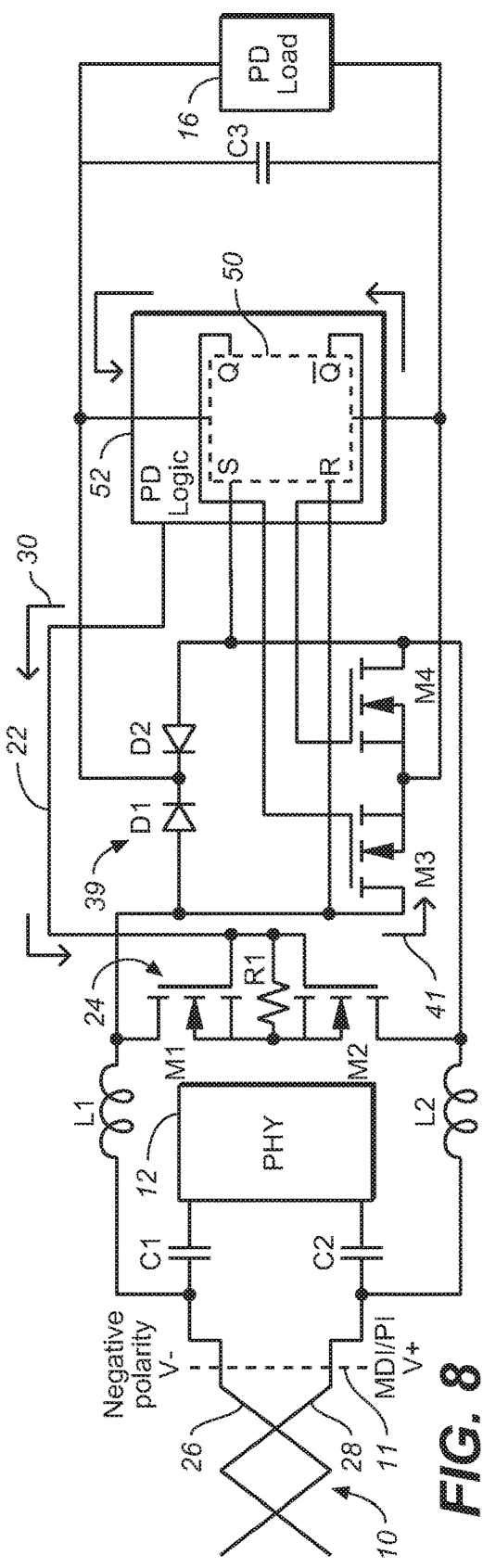
FIG. 8 illustrates a circuit similar to FIG. 7 except that a set-reset latch is shown in the PD logic circuit for controlling the MOSFETs in the bridge.

FIG. 8 shows the use of a set-reset latch 50 to control the MOSFETs M3 and M4 to rectify the voltage. A positive voltage applied to the set terminal causes the MOSFET M3 to turn on and the MOSFET M4 to turn off. A positive voltage applied to the reset terminal causes MOSFET M4 to turn on and the MOSFET M3 to turn off. In this manner, the appropriate MOSFET is turned on as a function of the voltage polarity at the MDI 11. The PD logic circuit 52 forces the appropriate MOSFET to be turned on, or remain on, when the shunting switch 24 is to be turned on, as described previously.

Figure 9:
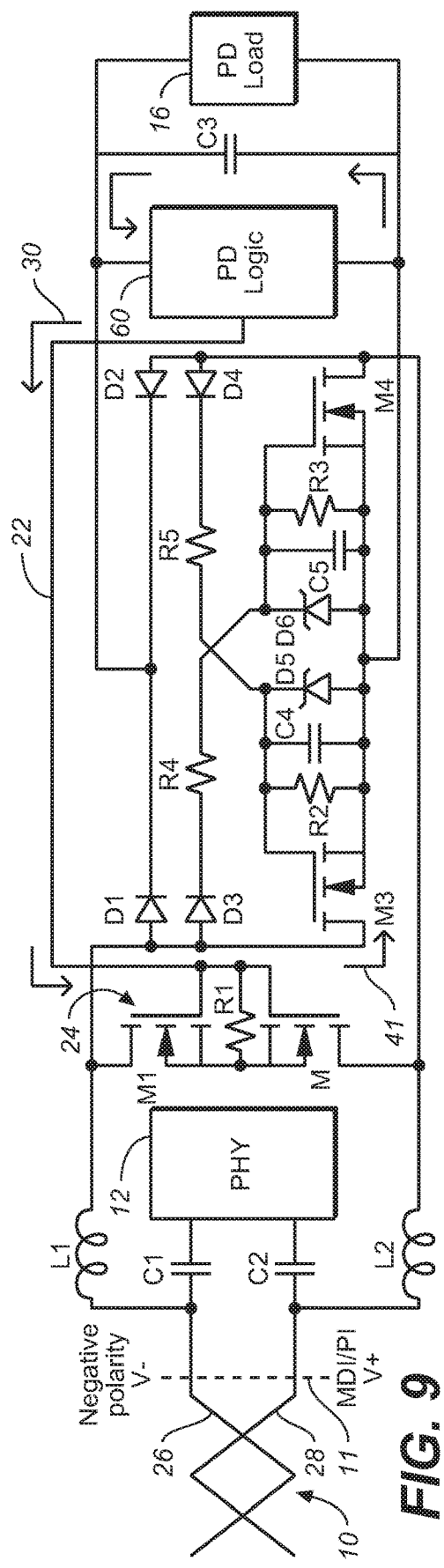

FIG. 9 is similar to FIG. 6 except the gates of the MOSFETs M3 and M4 are controlled by a parallel RC combination in shunt with the MOSFETs' M3 and M4 gate-to-source junctions. The RC combinations are the resistor R2 and capacitor C4, and the resistor R3 and capacitor C5.

The drains of MOSFETs M3 and M4 are cross-coupled to the gates of the MOSFETs M4 and M3 by diodes D3 and D4, respectively. The diodes D3 and D4 conduct the drain-to-source voltage of the MOSFETs M3 and M4 to the gate-to-source junctions of the MOSFETs M4 and M3, respectively. The resulting voltage across the MOSFETs' M3 and M4 gate-to-source junction may be limited by the resistors R4 and R5 in series with the diodes and voltage clamps (Zener diodes D5 and D6) in shunt with the gate-to-source junctions of the MOSFETs M3 and M4. The time constant of the parallel RC combinations should be long enough to ensure the MOSFETs M3 and M4 remain on for at least the maximum time the PD pulls the wire pair 10 low (shunting switch 24 on) during the classification phase. Thus, in the case of FIG. 9, the PD logic circuit 60 does not need to control the MOSFETs M3 and M4.

In all cases of FIGS. 3-9, the MOSFETs M3 and M4 are controlled by a control circuit when the shunting switch is to be turned on, where the control circuit is either in the PD logic circuit (an IC) or in circuitry (FIG. 9) external to the PD logic circuit.

Many other types of shunting switches may be used, such as using bipolar transistors, etc. A single transistor switch may also be used. All such shunting switches require a current path between the terminals of the holdup capacitor C3 and the gate terminal of the switch in order to operate.

Any of the disclosed features may be combined for a particular application.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A circuit for a Power over Data Lines (PoDL) system, the circuit comprising:
    a Powered Device (PD) logic circuit for conveying classification information to Power Sourcing Equipment (PSE), during a classification phase, via a first conductor and a second conductor;
    a controllable shunting switch configured to selectively shunt the first conductor and the second conductor together for communication with the PSE during the classification phase;
    a holdup capacitor for supplying power to the logic circuit during the classification phase, the capacitor having a first voltage terminal and a second voltage terminal;
    a full bridge rectifier circuit configured to rectify a voltage supplied by the PSE to the PD, the rectifier circuit comprising at least a first controllable switch and a second controllable switch; and
    a control circuit coupled to the first controllable switch and the second controllable switch, the control circuit configured to force one of the first controllable switch and the second controllable switch to be conductive during a time when the PD logic circuit controls the shunting switch to shunt the first conductor and the second conductor together, to create a completed circuit path between the first voltage terminal of the capacitor and the second voltage terminal of the capacitor via the shunting switch.

2. The circuit of claim 1 where the control circuit is part of the PD logic circuit.

3. The circuit of claim 1 wherein the full-bridge rectifier comprises a pair of diodes, the first controllable switch, and the second controllable switch, where the first controllable switch and the second controllable switch are transistors.

4. The circuit of claim 3 wherein the full-bridge rectifier comprises four transistors.

5. The circuit of claim 1 wherein the shunting switch comprises at least one transistor coupled between the first conductor and the second conductor.

6. The circuit of claim 5 wherein the shunting switch comprises a first metal-oxide-semiconductor field-effect transistor (MOSFET) and a second MOSFET in series between the first conductor and the second conductor.

7. The circuit of claim 6 further comprising a resistor coupled between a gate of the first MOSFET and a source of the first MOSFET.

8. The circuit of claim 1 wherein the logic circuit comprises a set-reset latch whose outputs control the first controllable switch and the second controllable switch in the full-bridge rectifier.

9. The circuit of claim 1 wherein the logic circuit and the shunting switch are within a same package.

10. The circuit of claim 1 wherein maximum power requirements are communicated by the PD to the PSE during the classification phase.

11. The circuit of claim 1 wherein, after the classification phase, the PSE supplies a Direct Current (DC) voltage to the first conductor and the second conductor to power a PD load.

12. The circuit of claim 1 further comprising a transceiver for receiving and transmitting differential signals via the first conductor and the second conductor after the classification phase.

13. A method performed by a circuit in a Power over Data Lines (PoDL) system, the method comprising:
    conveying classification information, by a Powered Device (PD) logic circuit, to Power Sourcing Equipment (PSE), during a classification phase, via a first conductor and a second conductor;
    controlling a shunting switch for selectively shunting the first conductor and the second conductor together for communication with the PSE during the classification phase;

supplying power to the logic circuit during the classification phase by a holdup capacitor, the capacitor having a first voltage terminal and a second voltage terminal;

rectifying a voltage supplied by the PSE on the first conductor and the second conductor using a full-bridge rectifier to ensure the capacitor is charged with a proper polarity voltage, irrespective of a voltage polarity applied to the first conductor and the second conductor by the PSE, the rectifier comprising at least a first controllable switch and a second controllable switch; and controlling the first controllable switch and the second controllable switch to force one of the first controllable switch and the second controllable switch to be conductive during a time when the PD logic circuit controls the shunting switch to shunt the first conductor and the second conductor together, to create a completed circuit path between the first voltage terminal of the capacitor and the second voltage terminal of the capacitor via the shunting switch.

14. The method of claim 13 wherein maximum power requirements are communicated by the PD to the PSE during the classification phase.

15. The method of claim 13 wherein the full-bridge rectifier comprises a pair of diodes, the first controllable switch, and the second controllable switch, where the first controllable switch and the second controllable switch are transistors.

16. The method of claim 13 wherein the full-bridge rectifier comprises four transistors.

17. The method of claim 13 wherein the shunting switch comprises at least one transistor coupled between the first conductor and the second conductor.

18. The method of claim 17 wherein the shunting switch comprises a first metal-oxide-semiconductor field-effect transistor (MOSFET) and a second MOSFET in series between the first conductor and the second conductor.

19. The method of claim 18 further comprising a resistor coupled between a gate of the first MOSFET and a source of the first MOSFET.

20. The method of claim 13 wherein, after the classification phase, the PSE supplies a Direct Current (DC) voltage to the first conductor and the second conductor to power a PD load.

* * * * *